United States Patent
Kim et al.

(10) Patent No.: US 11,312,821 B2
(45) Date of Patent: Apr. 26, 2022

(54) POLYESTER RESIN AND PREPARATION METHOD OF THE SAME

(71) Applicants: SK CHEMICALS CO., LTD., Gyeonggi-do (KR); SEOUL NATIONAL UNIVERSITY R&DB FOUNDATION, Seoul (KR)

(72) Inventors: Ji-Hyun Kim, Gyeonggi-do (KR); Jong Ryang Kim, Gyeonggi-do (KR); Cheol Hee Ahn, Seoul (KR)

(73) Assignees: SK Chemicals Co., Ltd., Gyeonggi-do (KR); Seoul National University R&DB Foundation, Seoul (KR)

( * ) Notice: Subject to any disclaimer, the term of this patent is extended or adjusted under 35 U.S.C. 154(b) by 0 days.

(21) Appl. No.: 16/772,019

(22) PCT Filed: Mar. 5, 2019

(86) PCT No.: PCT/KR2019/002539
§ 371 (c)(1),
(2) Date: Jun. 11, 2020

(87) PCT Pub. No.: WO2019/177297
PCT Pub. Date: Sep. 19, 2019

(65) Prior Publication Data
US 2021/0079157 A1    Mar. 18, 2021

(30) Foreign Application Priority Data

Mar. 12, 2018  (KR) .................. 10-2018-0028779
Jan. 8, 2019   (KR) .................. 10-2019-0002465

(51) Int. Cl.
*C08G 63/78*   (2006.01)
*C08G 63/183*  (2006.01)
*C08G 63/199*  (2006.01)
*C08L 67/02*   (2006.01)

(52) U.S. Cl.
CPC ......... *C08G 63/183* (2013.01); *C08G 63/199* (2013.01); *C08G 63/78* (2013.01); *C08L 67/02* (2013.01); *C08L 2201/08* (2013.01); *C08L 2201/10* (2013.01)

(58) Field of Classification Search
USPC .......................... 528/271, 272, 307
See application file for complete search history.

(56) References Cited

U.S. PATENT DOCUMENTS

| | | | |
|---|---|---|---|
| 9,034,982 B2 | 5/2015 | Andjelkovic et al. | |
| 2011/0040004 A1 | 2/2011 | Andjelkovic et al. | |
| 2012/0177854 A1 | 7/2012 | Lee et al. | |
| 2012/0282833 A1 | 11/2012 | Lee et al. | |
| 2015/0141612 A1 | 5/2015 | Lee et al. | |
| 2015/0291730 A1 | 10/2015 | Tamura et al. | |
| 2016/0222157 A1 | 8/2016 | Lee et al. | |
| 2016/0237240 A1* | 8/2016 | Perera | B29C 48/08 |
| 2019/0211145 A1* | 7/2019 | Strand | C08K 5/01 |

FOREIGN PATENT DOCUMENTS

| | | | |
|---|---|---|---|
| JP | 5370994 | 12/2013 | |
| KR | 10-2011-0028696 | 3/2011 | |
| KR | 10-2011-0075486 | 7/2011 | |
| KR | 10-2017-0037588 | 4/2017 | |
| KR | 20170037588 A * | 4/2017 | ............ C08G 63/18 |
| KR | 10-2017-0076558 | 7/2017 | |
| KR | 20170076558 A * | 7/2017 | ............ C08G 63/18 |
| KR | 10-1801702 | 11/2017 | |
| KR | 10-2017-0136074 | 12/2017 | |
| WO | WO 2014/088097 | 1/2017 | |

OTHER PUBLICATIONS

Machine Translation: KR20170076558A Han Kyu Chan et al. Polyester resin, preparation method thereof and resin article formed therefrom (Year: 2017).*
Machine Translation: KR20170037588A Lee Yoo Jin et al. Polyester resin copolymerized with isosorbide and 1,4-cyclohexane dimethanol and preparing method thereof (Year: 2017).*
International Search Report and Written Opinion for International (PCT) Patent Application No. PCT/KR2019/002539, dated Jun. 13, 2019, 10 pages.

* cited by examiner

*Primary Examiner* — Terressa Boykin
(74) *Attorney, Agent, or Firm* — Sheridan Ross P.C.

(57) ABSTRACT

Provided are a polyester resin having a high residual rate of isosorbide, thereby exhibiting excellent heat resistance, excellent mechanical properties such as tensile strength, Young's modulus, etc., and excellent appearance properties and transparency, and a preparation method thereof.

13 Claims, No Drawings

POLYESTER RESIN AND PREPARATION METHOD OF THE SAME

CROSS-REFERENCE TO RELATED APPLICATIONS

This application is a national stage application under 35 U.S.C. 371 and claims the benefit of PCT Application No. PCT/KR2019/002539 having an international filing date of 5 Mar. 2019, which designated the United States, which PCT Application claims the benefit of priority from, Korean Patent Application Nos. 10-2018-0028779 and 10-2019-0002465, filed on Mar. 12, 2018 and Jan. 8, 2019, respectively, the disclosures of which are hereby incorporated by reference herein in their entirety.

TECHNICAL FIELD

The present invention relates to a polyester resin and a preparation method thereof. More particularly, the present invention relates to a polyester resin that exhibits excellent physical properties such as high heat resistance, impact resistance, etc., and has excellent appearance properties, high transparency, and molding characteristics, and a preparation method thereof.

BACKGROUND ART

Generally, polyester resins prepared from aromatic and/or aliphatic dicarboxylic acid and diol with an optimum structure have excellent physical and chemical properties, have solubility in general solvents and flexibility, have good adhesion to a broad range of materials and good coating workability, etc., and thus polyester resins are used in various applications, such as for fibers, films, adhesives, etc.

In order to improve physical properties of such polyester resins, polyester resins copolymerized with two or more diol or dicarboxylic acid components has been commercially widely used. In particular, there is a known method of using isosorbide (1,4:3,6-dianhydroglucitol), which is an environment-friendly diol compound derived from starch, as one of monomers. Polyester resins including isosorbide exhibit a high glass transition temperature, and thus may be variously applied to articles which are required to have heat resistance.

Meanwhile, in the preparation of polyester resins, proportions of raw materials present in the main chain of the final polyester resin vary depending on reactivity of the raw materials during esterification or transesterification reaction and on degree of vaporization of the raw materials during polycondensation reaction. With regard to the diol component represented by alkylene glycol, secondary or tertiary alcohols are less reactive than primary alcohols, and tertiary alcohols are less reactive than secondary alcohols. For this reason, when secondary or tertiary alcohols are included as raw materials, there is a problem in that their residual rate in the main chain of polyester resin is low, a reaction time is greatly increased, or a reaction yield is significantly reduced.

A secondary alcohol isosorbide also exhibits a low residual rate in the main chain of polyester due to its low reactivity, and thus there is a problem in that it is difficult to sufficiently achieve desired physical properties such as heat resistance, impact resistance, etc. Accordingly, there is a demand for a new composition of the polyester resin capable of overcoming the problem of the low residual rate of isosorbide, and a preparation method thereof.

DISCLOSURE

Technical Problem

To solve the above problem, an object of the present invention is to provide a polyester resin that has an improved residual rate of isosorbide, thereby exhibiting excellent physical properties such as heat resistance, chemical resistance, impact resistance, etc., and having excellent appearance properties, high transparency, and molding characteristics, and a preparation method thereof.

Technical Solution

There is provided a polyester resin including:
moieties of dicarboxylic acid components including terephthalic acid; and
moieties of diol components including isosorbide and 1,2-propanediol,
wherein isosorbide-derived moieties are 5 mol % or more and 1,2-propanediol-derived moieties are 10 mol % or more in 100 mol % of the moieties of diol components.

Preferably, the moieties of diol components may include 5 mol % to 70 mol % of isosorbide-derived moieties and 30 mol % to 95 mol % of 1,2-propanediol-derived moieties.

Preferably, the polyester resin may have a glass transition temperature (Tg) of 80° C. or higher.

According to one exemplary embodiment of the present invention, the diol components may further include one or more diol compounds selected from the group consisting of C8-C40 aromatic diols and C2-C20 aliphatic diols, in addition to isosorbide and 1,2-propanediol.

In one exemplary embodiment, the diol components may further include 1,4-cyclohexanedimethanol, in addition to isosorbide and 1,2-propanediol. In this regard, the moieties of diol components may include 5 mol % to 45 mol % of isosorbide-derived moieties, 10 mol % to 50 mol % of 1,2-propanediol-derived moieties, and the balance of 1,4-cyclohexanedimethanol-derived moieties.

The dicarboxylic acid components may further include one or more acid components selected from the group consisting of C8-C20 aromatic dicarboxylic acid components and C4-C20 aliphatic dicarboxylic acid components, in addition to terephthalic acid.

Further, the polyester resin of the present invention may include moieties of C6-C20 multifunctional carboxylic acid components.

Further, there is provided a method of preparing a polyester resin, wherein a residual rate of isosorbide in the polyester is 40% or more, the method including the steps of:
performing an esterification or transesterification reaction between dicarboxylic acid components including terephthalic acid, and diol components including isosorbide and 1,2-propanediol at a pressure of 0.2 kg/cm$^2$ to 3.0 kg/cm$^2$ and at a temperature of 200° C. to 300° C.; and
performing a polycondensation reaction of the reaction product at a reduced pressure of 400 mmHg to 0.1 mmHg and at a temperature of 240° C. to 300° C.

In the method of preparing the polyester resin according to one exemplary embodiment of the present invention, the diol components may include 5 mol % to 70 mol % of isosorbide and 30 mol % to 95 mol % of 1,2-propanediol with respect to the total 100 mol % of the diol components.

Alternatively, the diol components may further include 1,4-cyclohexanedimethanol. In this regard, the diol components may include 5 mol % to 50 mol % of isosorbide, 10 mol % to 75 mol % of 1,2-propanediol, and the balance of 1,4-cyclohexanedimethanol with respect to the total 100 mol % of the diol components.

In the method of preparing the polyester resin according to one exemplary embodiment of the present invention, a molar ratio of the dicarboxylic acid components and the diol components may be 1:1 to 1:3.

Further, according to one exemplary embodiment of the present invention, C6-C20 multifunctional carboxylic acid components may be further included in the esterification or transesterification reaction step.

Effect of the Invention

A polyester resin of the present invention has a high residual rate of isosorbide, thereby exhibiting excellent heat resistance, and excellent mechanical properties such as tensile strength, Young's modulus, etc., as well as excellent appearance properties and transparency.

BEST MODE FOR CARRYING OUT THE INVENTION

Hereinafter, the present invention will be described in detail.

Polyester Resin

Provided is a polyester resin including:

moieties of dicarboxylic acid components including terephthalic acid; and moieties of diol components including isosorbide and 1,2-propanediol, wherein isosorbide-derived moieties are 5 mol % or more and 1,2-propanediol-derived moieties are 10 mol % or more in 100 mol % of the moieties of diol components.

Generally, the polyester resin mainly includes ethylene glycol as the diol components, and further includes diol to improve physical properties, in addition to ethylene glycol. When isosorbide (1,4:3,6-dianhydroglucitol) is added to the polyester resin, it exhibits effects of improving heat resistance and improving physical properties such as chemical resistance, chemical resistance, etc. For this reason, isosorbide is used, together with ethylene glycol, as the diol components. However, since isosorbide is a secondary alcohol, its reactivity is very low, as compared with ethylene glycol which is a primary alcohol. Thus, due to a reduced degree of polymerization, it is difficult to obtain a resin with a high molecular weight, and a residual rate of isosorbide in the polyester resin is reduced. Accordingly, there has been a problem in that a desired level of heat resistance may not be sufficiently obtained.

To solve the above problem, the present inventors conducted various researches, and as a result, they found that when 1,2-propanediol is used instead of commonly used ethylene glycol, isosorbide reactivity is increased, and thus a resin having a high molecular weight may be obtained, and the residual rate of isosorbide in the main chain of the prepared polyester resin may be increased. Therefore, the polyester resin of the present invention exhibits improved heat resistance and chemical resistance due to the increased residual rate of isosorbide. Furthermore, the polyester resin of the present invention exhibits mechanical properties such as tensile strength, Young's modulus, etc., which are equivalent to or higher than those of a polyester resin including ethylene glycol and having the similar content of isosorbide. Accordingly, the polyester resin of the present invention may be preferably applied to food containers and packaging materials, packaging materials and materials for medical use, building materials, vehicle interior materials, electronic product materials, etc. through injection and extrusion molding.

As used herein, the residual rate refers to a content of a monomer included in a final polyester after the polymerization process relative to the input amount of each raw material (monomer). For example, the residual rate of isosorbide may be calculated by Equation 1 below.

Residual rate of isosorbide (%)=(mol % of isosorbide-derived moieties in 100 mol % of moieties of diol components of polyester resin)/(number of moles of isosorbide injected during preparation of polyester resin)*100     [Equation 1]

As used herein, the term 'moiety' refers to a certain segment or unit that is included in a product of a chemical reaction and derived from a specific compound when the specific compound participates in the chemical reaction. For example, the 'moieties' of the dicarboxylic acid components or the 'moieties' of the diol components refer to segments derived from the dicarboxylic acid components or segments derived from the diol components in the polyester formed by an esterification or polycondensation reaction, respectively.

The dicarboxylic acid components are intended to include dicarboxylic acids such as terephthalic acid, etc., alkyl esters thereof (including C1-C4 lower alkyl esters such as monomethyl, monoethyl, dimethyl, diethyl, dibutyl esters, etc.), and/or acid anhydrides thereof. The dicarboxylic acids may react with the diol components to form dicarboxylic acid moieties such as terephthaloyl moieties, etc.

When the dicarboxylic acid components used in the synthesis of polyester include terephthalic acid, physical properties such as heat resistance, chemical resistance, weather resistance (e.g., prevention of molecular weight reduction or yellowing caused by UV), etc. of the prepared polyester resin may be improved.

The dicarboxylic acid components may further include aromatic dicarboxylic acid components, aliphatic dicarboxylic acid components, or mixtures thereof as other dicarboxylic acid components. In this regard, the term 'other dicarboxylic acid components' means dicarboxylic acid components other than terephthalic acid among the dicarboxylic acid components.

The aromatic dicarboxylic acid components may be C8-C20, preferably C8-C14 aromatic dicarboxylic acids, mixtures thereof, etc. Examples of the aromatic dicarboxylic acid include phthalic acid, isophthalic acid, naphthalenedicarboxylic acids such as 2,6-naphthalenedicarboxylic acid, etc., diphenyl dicarboxylic acids, 4,4'-stilbenedicarboxylic acid, 2,5-furandicarboxylic acid, 2,5-thiophenedicarboxylic acid, etc., but specific examples of the aromatic dicarboxylic acid are not limited thereto.

The aliphatic dicarboxylic acid components may be C4-C20, preferably C4-C12 aliphatic dicarboxylic acid components, mixtures thereof, etc. Examples of the aliphatic dicarboxylic acids include cyclohexanedicarboxylic acids such as 1,4-cyclohexanedicarboxylic acid, 1,3-cyclohexanedicarboxylic acid, etc., and linear, branched, or cyclic aliphatic dicarboxylic acid components such as sebacic acid, succinic acid, isodecyl succinic acid, maleic acid, fumaric acid, adipic acid, glutaric acid, azelaic acid, etc., but specific examples of the aliphatic dicarboxylic acid are not limited thereto. Such aliphatic dicarboxylic acids may decrease the glass transition temperature of the resin, as compared with aromatic dicarboxylic acid, and thus the aliphatic dicarboxylic acids are preferably used in as small amount as possible, for example, the aliphatic dicarboxylic acid-derived moieties are 30 mol % or less in the dicarboxylic acid-derived moieties.

The moieties of dicarboxylic acid components may include 50 mol % to 100 mol %, preferably 70 mol % to 100 mol %, of terephthalic acid-derived moieties; and 0 mol % to 50 mol %, preferably 0 mol % to 30 mol %, of one or more dicarboxylic acid-derived moieties selected from the group consisting of aromatic dicarboxylic acids and aliphatic dicarboxylic acids. If the content of terephthalic acid-derived moieties in the moieties of the dicarboxylic acid components is too small, physical properties of the polyester resin, such as heat resistance, chemical resistance, or weather resistance, may be deteriorated.

Further, in the present invention, a multifunctional carboxylic acid may be further used, in addition to dicarboxylic acid. The multifunctional carboxylic acid refers to carboxylic acid having three or more carboxyl groups. The multifunctional carboxylic acid is a C6-C20, preferably, a C6-C9 aromatic or aliphatic multifunctional carboxylic acid component, and includes trimellitic acid, trimellitic anhydride, hemimellitic acid, hemimellitic anhydride, trimesic acid, tricarballylic acid, etc., but is not limited thereto.

The multifunctional carboxylic acid has an advantage of improving processability during extrusion molding by increasing melt viscosity of the resin through crosslinking. However, when the multifunctional carboxylic acid is excessively used, the melt viscosity of the resin becomes excessively high to deteriorate workability, and the resin becomes brittle, which may deteriorate physical properties such as impact strength, etc. Therefore, the multifunctional carboxylic acid is optionally used, as needed, and moieties of the multifunctional carboxylic acid component are preferably used in the range of 0 mol % to 5 mol % with respect to 100 mol % of moieties of the dicarboxylic acid components.

The diol components included in the polyester resin of the present invention may include isosorbide and 1,2-propanediol, and may further include other diol compounds.

The isosorbide is included as one of diol components in order to improve physical properties such as heat resistance, chemical resistance, and chemical resistance of the resin. According to one exemplary embodiment of the present invention, the isosorbide-derived moieties are included in an amount of 5 mol % or more, specifically in the range of 5 mol % to 70 mol %, and more preferably in the range of 10 mol % to 60 mol %, in 100 mol % of moieties of the diol components. If the content of the isosorbide-derived moieties is less than 5 mol %, it is difficult to obtain heat resistance of the polyester resin. If the content of the isosorbide-derived moieties is more than 70 mol %, appearance properties of the polyester resin may be deteriorated or yellowing may occur. Therefore, it is preferable that the content satisfies the above range.

The 1,2-propanediol is one of diol components included as an alternative to ethylene glycol, and is included to increase fluidity and mechanical strength of the polyester resin and to increase the residual rate of isosorbide. Commonly, ethylene glycol is mainly used as the diol component of polyester resin. However, when 1,2-propanediol is used instead of ethylene glycol, there is an effect of improving the residual rate of isosorbide in the main chain, and as a result, heat resistance and durability of the prepared polyester resin may be improved. Further, the polyester resin including 1,2-propanediol exhibits heat resistance and mechanical properties equivalent to or higher than those of a polyester resin including ethylene glycol and having the same content of isosorbide.

To secure the above effect, 1,2-propanediol-derived moieties are preferably included in an amount of 10 mol % or more, 20 mol % or more, or 30 mol % or more, and 95 mol % or less, or 90 mol % or less in 100 mol % of moieties of diol components.

Specifically, the polyester resin of the present invention may include 5 mol % to 70 mol % of isosorbide-derived moieties and 30 mol % to 95 mol % of 1,2-propanediol-derived moieties, or may include 10 mol % to 60 mol % of isosorbide-derived moieties and 40 mol % to 90 mol % of 1,2-propanediol-derived moieties in 100 mol % of moieties of diol components.

Meanwhile, in the present invention, other diol compounds which may be included in addition to isosorbide and 1,2-propanediol are not particularly limited, as long as they are commonly used in the preparation of polyester. For example, other diol compounds may be aliphatic diol, aromatic diol, or a mixture thereof.

The aromatic diol may include C8-C40, preferably, C8-C33 aromatic diol compounds. Examples of the aromatic diol compounds may include ethylene oxide such as polyoxyethylene-(2.0)-2,2-bis(4-hydroxyphenyl) propane, polyoxypropylene-(2.0)-2,2-bis(4-hydroxyphenyl)propane, polyoxypropylene-(2.2)-polyoxyethylene-(2.0)-2,2-bis(4-hydroxyphenyl)propane, polyoxyethylene-(2.3)-2,2-bis(4-hydroxyphenyl)propane, polyoxypropylene-(6)-2,2-bis(4-hydroxyphenyl)propane, polyoxypropylene-(2.3)-2,2-bis(4-hydroxyphenyl)propane, polyoxypropylene-(2.4)-2,2-bis(4-hydroxyphenyl)propane, polyoxypropylene-(3.3)-2,2-bis(4-hydroxyphenyl)propane, polyoxyethylene-(3.0)-2,2-bis(4-hydroxyphenyl)propane, polyoxyethylene-(6)-2,2-bis(4-hydroxyphenyl)propane, etc. and/or propylene oxide addition bisphenol A derivatives (polyoxyethylene-(n)-2,2-bis(4-hydroxyphenyl)propane, polyoxypropylene-(n)-2,2-bis(4-hydroxyphenyl)propane or polyoxypropylene-(n)-polyoxyethylene-(n)-2,2-bis(4-hydroxyphenyl)propane, etc., but specific examples of the aromatic diol compounds are not limited thereto. Here, n means the number of polyoxyethylene or polyoxypropylene units.

The aliphatic diols may include C2-C20, preferably C2-C12 aliphatic diol compounds. Examples of the aliphatic diol compounds may include linear, branched, or cyclic aliphatic diol components such as ethylene glycol, diethylene glycol, triethylene glycol, 1,3-propanediol, 1,4-butanediol, 2,3-butanediol, 1,3-butanediol, pentanediols (1,5-pentanediol, etc.), hexanediols (e.g., 1,6-hexanediol, etc.), neopentyl glycol (2,2-dimethyl-1,3-propanediol), 1,2-cyclohexanediol, 1,4-cyclohexanediol, 1,2-cyclohexanedimethanol, 1,3-cyclohexanedimethanol, 1,4-cyclohexanedimethanol, and tetramethylcyclobutanediol, but specific examples of the aliphatic diol compounds are not limited thereto.

When the above-described other diol compounds are further included as the diol components, other diol compound-derived moieties are preferably included in an amount of less than 70 mol %, or less than 60 mol %, or less than 50 mol % in 100 mol % of the moieties of diol components, and a lower limit of the content may be, but is not limited to, specifically 0 mol % or more, 5 mol % or more, or 10 mol % or more. If the content of other diol compound-derived moieties in the moieties of diol components exceeds 70 mol %, the contents of the isosorbide-derived moieties and the 1,2-propanediol-derived moieties are relatively decreased, and thus it is difficult to sufficiently secure the effects of heat resistance, chemical resistance, tensile strength, etc. Particularly, diethylene glycol, triethylene glycol, 1,3-propanediol, 1,4-butanediol, 2,3-butanediol, 1,3-butanediol, pentanediol (1,5-pentanediol, etc.), hexanediol (1,6-hexanediol, etc.), and neopentyl glycol (2,2-dimethyl-1,3-propanediol) may decrease the glass transition temperature of the resin, as compared with other aliphatic diols, and therefore, the aliphatic diol-derived moieties are preferably used in as small amount as possible, for example, the aliphatic diol-derived moieties are included in an amount of 30 mol % or less or in the range of 0 mol % to 10 mol % in 100 mol % of the moieties of diol components.

Meanwhile, according to one exemplary embodiment of the present invention, 1,4-cyclohexanedimethanol may be used as other diol compounds in order to improve impact resistance of the polyester resin. As described, the polyester resin further including 1,4-cyclohexanedimethanol may specifically include 5 mol % to 45 mol % of isosorbide-derived moieties, 10 mol % to 50 mol % of 1,2-propanediol-derived moieties, and the balance of 1,4-cyclohexanedimethanol-derived moieties, or 5 to 40 mol % of isosorbide-derived moieties, 20 to 45 mol % of 1,2-propanediol-derived moieties, and the balance of 1,4-cyclohexanedimethanol-derived moieties in 100 mol % of the moieties of diol components. When the content of the moieties of diol components satisfies the above range, it is preferable in terms of securing heat resistance, chemical resistance, impact resistance, etc.

The above-described polyester resin of the present invention may include isosorbide as the diol component to exhibit excellent heat resistance and strength. Specifically, the polyester resin of the present invention may have a glass transition temperature (Tg) of 80° C. or higher, 90° C. or higher, 95° C. or higher, or 100° C. or higher, and Young's modulus of 1350 MPa or more, 1400 MPa or more, or 1450 MPa or more. Methods of measuring the glass transition temperature and Young's modulus may be specified in exemplary embodiments described below.

Further, the polyester resin of the present invention has intrinsic viscosity (IV) of 0.45 or more, 0.50 or more, or 0.52 or more, and exhibits a high molecular weight, even though isosorbide is included.

As described, since the polyester resin of the present invention exhibits a high molecular weight and excellent heat resistance and strength properties, it may be properly applied to food containers and packaging materials, packaging materials and equipment for medical use, vehicle and electronic product materials, building materials, etc., which are required to have heat resistance and stiffness.

Method of Preparing Polyester Resin

Meanwhile, provided is a method of preparing the above-described polyester resin of the present invention. Specifically, provided is a method of preparing the polyester resin, the method including the steps of:

performing an esterification or transesterification reaction between dicarboxylic acid components including terephthalic acid, and diol components including isosorbide and 1,2-propanediol at a pressure of 0.2 kg/cm² to 3.0 kg/cm² and at a temperature of 200° C. to 300° C.; and performing a polycondensation reaction of the reaction product at a reduced pressure of 400 mmHg to 0.1 mmHg and at a temperature of 240° C. to 300° C.

According to the preparation method of the present invention, in which 1,2-propanediol is used as the diol component, instead of commonly used ethylene glycol, it is possible to solve the problems of the reduced degree of polymerization and the reduced residual rate of isosorbide in the main chain of polyester which are caused by low reactivity of isosorbide, and therefore, it is possible to prepare a polyester resin having an excellent heat resistance property, mechanical properties, appearance properties, and moldability.

In the method of preparing the polyester resin of the present invention, the dicarboxylic acid components may include 1 mol % to 100 mol % or 30 mol % to 100 mol % of terephthalic acid, alkyl ester thereof, and/or acid anhydride thereof, and the balance of the above-described other aromatic and/or aliphatic dicarboxylic acid components with respect to the total 100 mol % of dicarboxylic acid components.

When only isosorbide and 1,2-propanediol are used as the diol components, 5 mol % to 70 mol % of isosorbide and 30 mol % to 95 mol % of 1,2-propanediol may be included with respect to the total 100 mol % of diol components.

Meanwhile, when the above-described other diol compounds are included as the diol components, in addition to isosorbide and 1,2-propanediol, other diol compounds may be preferably included in an amount of less than 80 mol %, less than 70 mol %, or less than 60 mol % with respect to the total 100 mol % of diol components.

More specifically, when 1,4-cyclohexanedimethanol is further included as other diol compounds, 5 mol % to 50 mol % of isosorbide, 10 mol % to 75 mol % of 1,2-propanediol, and the balance of 1,4-cyclohexanedimethanol may be preferably included with respect to the total 100 mol % of diol components.

Upon satisfying the above input amounts of the dicarboxylic acid components and the diol components, polyester resins having moieties of dicarboxylic acid components and moieties of diol components in an appropriate content range may be prepared.

Further, a molar ratio of the dicarboxylic acid components and the diol components is preferably in the range of 1:1 to 1:3, or 1:1.05 to 1:2.05. If the molar ratio of the dicarboxylic acid components and the diol components is less than 1:1, unreacted acid components may remain during polymerization, causing poor transparency of the resin. If the molar ratio is more than 1:3, a polymerization rate becomes too slow, and as a result, productivity of the resin may be deteriorated. Therefore, it is preferable that the molar ratio satisfies the above range.

During the esterification or transesterification reaction, the above-described C6-C20 multifunctional carboxylic acid may be further included, in addition to the dicarboxylic acid components and the diol components. In this case, processability of the polyester resin prepared as above may be improved. However, when used in excess, processability may be deteriorated and physical properties such as impact strength may be deteriorated. Therefore, the multifunctional dicarboxylic acid is preferably used in the range of 0 mol % to 5 mol % with respect to 100 mol % of the dicarboxylic acid components.

The esterification or transesterification reaction (hereinafter, referred to as esterification reaction) may be carried out in a batch or continuous manner. The raw materials may be separately injected, but a slurry formed by mixing the dicarboxylic acid components and the diol components is preferably injected. At this time, water may be further added to increase solubility of the diol components, such as isosorbide, etc., which are in the form of a solid at room temperature, or the slurry may be prepared at 60° C. or higher to melt the solid.

The esterification reaction may be carried out at a temperature of 200° C. to 300° C., preferably 220° C. to 280° C., and more preferably 235° C. to 265° C., and at a pressure of 0.1 kg/cm² to 3.0 kg/cm², and preferably 0.2 kg/cm² to 3.0 kg/cm². At this time, it is preferable that water or alcohol generated as a by-product during the esterification reaction is continuously discharged from a reactor to increase the reaction rate.

The esterification time (average retention time) may be commonly 100 min to 10 h and preferably 2 h to 500 min, and may vary depending on the reaction temperature and pressure, and the molar ratio of dicarboxylic acid components and diol components to be used.

The esterification reaction may be carried out without a catalyst, but may be carried out by adding an appropriate catalyst in order to shorten the reaction time. Applicable catalysts may include titanium-, aluminum-, tin-, germanium-, antimony-based catalysts, etc., and these catalysts may act as a catalyst for the sub sequent polycondensation reaction.

As the useful titanium-based catalysts, tetraethyl titanate, acetyltripropyl titanate, tetrapropyl titanate, tetrabutyl titanate, polybutyl titanate, 2-ethylhexyl titanate, octylene glycol titanate, lactate titanate, triethanolamine titanate, acetyl acetonate titanate, ethyl acetoacetic ester titanate, isostearyl titanate, titanium dioxide, a titanium dioxide/silicon dioxide copolymer, or a titanium dioxide/zirconium dioxide copolymer may be exemplified. As the germanium-based catalysts, germanium dioxide, or a copolymer thereof, may be exemplified. As the tin-based catalysts, tetrabutyldibutoxytin oxide, dibutyltin oxide, dibutyltin dilaurate may be exemplified. These catalysts may be used alone or in combination.

The catalyst may be preferably used in the range of 10 ppm to 500 ppm, or 100 ppm to 300 ppm, in terms of the central metal of the catalyst, with respect to the total weight of the dicarboxylic acid components and the diol components which are raw materials. If the content of the catalyst is less than 10 ppm, the amount of the catalyst may be insufficient, and thus the reaction rate may become slow, and if the content exceeds 500 ppm, a side reaction may occur or the catalyst may remain in the polyester resin to be produced. Therefore, it is preferable that the content of the catalyst satisfies the above range.

In the esterification reaction, a phosphorus-based stabilizer such as phosphoric acid, trimethyl phosphate, triethyl phosphate, etc. may be further added. The addition amount of the phosphorus-based stabilizer may be 30 ppm to 500 ppm, or 50 ppm to 300 ppm, in terms of phosphorus, with respect to the total weight of the raw materials. If the addition amount of the stabilizer is less than 30 ppm, the stabilization effect is poor, and thus the color of the polyester resin may turn yellow. If the addition amount exceeds 500 ppm, a polymer having a desired high polymerization degree may not be obtained.

After completion of the esterification reaction, a polycondensation reaction is carried out. The polycondensation reaction is carried out at a temperature of 230° C. to 300° C., preferably 240° C. to 290° C., and more preferably 250° C. to 280° C., and at a reduced pressure of 400 mmHg to 0.1 mmHg. The reduced pressure condition of 400 mmHg to 0.1 mmHg is to remove diols and oligomers which are by-products of the polycondensation reaction. The polycondensation reaction is carried out for a time required until the desired intrinsic viscosity is reached, for example, for an average retention time of 1 h to 10 h.

When the polyester resin is prepared according to the preparation method of the present invention, the residual rate of isosorbide is as high as 40% or more, or 45% or more, or 50% or more. Therefore, the polyester resin prepared by the method may exhibit excellent heat resistance, chemical resistance, and mechanical properties. The residual rate refers to the content of the monomer included in the final polyester after the polymerization process, relative to the input amount of the raw material (monomer).

Further, according to the preparation method of the present invention, reactivity of isosorbide may be improved to increase the degree of polymerization, and the resulting polyester resin may exhibit high intrinsic viscosity (IV) of 0.45 or more, 0.50 or more, or 0.52 or more.

Hereinafter, actions and effects of the present invention will be described in more detail with reference to specific examples of the present invention. However, these examples are for illustrative purposes only, and the scope of the present invention is not intended to be limited thereby.

Methods of testing polyester resins and tensile specimens of the following examples and comparative examples are as follows.

(1) Analysis of Moieties of Diol Components in Resin

The content of moieties of diol components in resins were analyzed by nuclear magnetic resonance (NMR). In detail, integral values of peaks of dicarboxylic acid and multifunctional carboxylic acid in NMR peaks of the polyester resin were regarded as 100, and relative intensity of hydrogen peaks of oxymethylene of each diol was obtained to calculate a molar concentration. At this time, 600 MHz NMR (JEOL) was used as an NMR instrument, and $CDCl_3$ was used as a solvent.

(2) Intrinsic Viscosity (IV)

The polyester resin was dissolved at a concentration of 0.12% in ortho-chlorophenol at 150° C., and measurement was performed using an Ubbelohde-type viscometer in a thermostatic bath at 35° C.

(3) Number Average Molecular Weight (Mn)

A number average molecular weight was determined using gel permeation chromatography (GPC, Tosoh) by the following method. Shodex LF804 X 2 was used as a GPC column, and a refractive index (RI) detector was used as a detector.

0.03 g of the polyester resin was dissolved in 3 mL of ortho-chlorophenol at 150° C. for 15 min, and then 9 mL of chloroform was added at room temperature to prepare a sample. 12 mL of a solution of ortho-chlorophenol:chloroform=1:3 (v/v) was used as an eluent, and measurement was performed by injecting the sample at a flow rate of 0.7 ml/min at 40° C. The Mn value was determined from a calibration curve made using polystyrene standards.

(4) Heat Resistance (Tg)

The polyester resin was annealed at 300° C. for 5 min, and cooled to room temperature, and then, at a heating rate of 10° C./min, Tg was measured during a $2^{nd}$ scan.

(5) Color b

Measurement was performed using a Colorgard System available from Pacific Scientific Company.

(6) Haze (%)

A film sample of a copolymerized polyester resin composition was aged for 24 h at a temperature of 23° C. and RH humidity of 65%, and then haze (%) for three different positions of the film sample was measured in accordance with JIS (Japanese Industrial Standards) K7136 using a haze meter (device name: NDH2000, manufacturer: Nippon Denzeoku (Japan)), and the average values of respective measurement results were calculated as result values.

(7) Tensile Strength and Young's Modulus

A tensile specimen (0.4 cm in width, 3 cm in length, 0.2 cm in thickness, ISO 527-21 BB type) of the polyester resin was manufactured using a baby injection molding machine at a barrel temperature of 230° C. and a pressure of 600 $kgf/cm^2$ under conditions of a mold temperature of 30° C., an injection time of 3 s, a holding pressure time of 5 s, and a cooling time of 10 s, and then tensile strength and Young's modulus were measured using UTM.

Examples 1 to 7

In a 5 L reactor equipped with a stirrer and an outlet condenser, raw materials, i.e., dimethylterephthalic acid (DMT), isosorbide (ISB), 1,4-cyclohexanedimethanol (CHDM), and 1,2-propanediol (1,2-PD) were injected according to the contents of Table 1 below. Triethyl phosphate (TEP) which is a phosphorus-based stabilizer and dibutyltin oxide (DBTO) which is a catalyst were added thereto in terms of each central atom according to the contents of Table 1, with respect to the total weight of the raw materials, and then pressurized with nitrogen to a pressure of 2.0 kg/cm², and reaction was allowed while raising the temperature of the reactor to 220° C. to 250° C.

At this time, generated methanol was discharged from the system, followed by transesterification. When generation and discharge of methanol were finished, the reaction product was transferred to a polycondensation reactor equipped with a stirrer, a cooling condenser, and a vacuum system to perform polycondensation, and the polymerization was terminated when the intrinsic viscosity of the reaction product reached its maximum value.

Comparative Examples 1 to 7

Polyester resins were prepared in the same manner as in Examples 1 to 7, except that ethylene glycol (EG) was used instead of 1,2-propanediol, and raw materials were injected according to the contents in Table 2 below.

TABLE 1

| | Components | | Example 1 | Example 2 | Example 3 | Example 4 | Example 5 | Example 6 | Example 7 |
|---|---|---|---|---|---|---|---|---|---|
| Input ratio | Diacid | DMT (mol) | 100 | 100 | 100 | 100 | 100 | 100 | 100 |
| | Diol | ISB (mol) | 12 | 20 | 40 | 50 | 60 | 80 | 100 |
| | | CHDM (mol) | 45 | 45 | 45 | 50 | 45 | 45 | 45 |
| | | 1,2-PD (mol) | 143 | 135 | 115 | 100 | 95 | 75 | 55 |
| | Reaction catalyst | DBTO (ppm) | 300 | 300 | 300 | 250 | 300 | 250 | 250 |
| | Stabilizer | TEP (ppm) | 200 | 200 | 200 | 200 | 200 | 200 | 200 |
| Experimental results | Diol composition | ISB (mol %) | 7 | 12 | 19 | 20 | 25 | 33 | 40 |
| | | CHDM (mol %) | 47 | 47 | 46 | 50 | 45 | 45 | 46 |
| | | 1,2-PD (mol %) | 46 | 41 | 35 | 30 | 30 | 22 | 14 |
| | ISB residual rate (%) | | 58.3 | 60.0 | 47.5 | 40.0 | 41.7 | 41.3 | 40.0 |
| | IV (dl/g) | | 0.61 | 0.62 | 0.64 | 0.63 | 0.64 | 0.58 | 0.59 |
| | Number average molecular weight (Mn) | | 22,000 | 22,100 | 22,400 | 22,300 | 22,000 | 18,000 | 20,600 |
| | Heat resistance, Tg (° C.) | | 94 | 99 | 103 | 104 | 110 | 114 | 121 |
| | Color b | | 1.5 | 1.5 | 1.5 | 1.5 | 2 | 2.5 | 2.5 |
| | Haze (%) | | <1 | <1 | <1 | <1 | <1 | <1 | <1 |
| | Tensile strength (MPa) | | 44 | 45 | 46 | 47 | 48 | 49 | 50 |
| | Young's modulus (MPa) | | 1440 | 1420 | 1470 | 1400 | 1440 | 1590 | 1550 |

TABLE 2

| | Components | | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|---|
| Input ratio | Diacid | DMT (mol) | 100 | 100 | 100 | 100 | 100 | 100 | 100 |
| | Diol | ISB (mol) | 20 | 40 | 50 | 60 | 80 | 100 | 120 |
| | | CHDM (mol) | 45 | 45 | 50 | 45 | 45 | 45 | 45 |
| | | EG (mol) | 135 | 115 | 100 | 95 | 75 | 75 | 55 |
| | Reaction catalyst | DBTO (ppm) | 300 | 300 | 250 | 300 | 300 | 300 | 300 |
| | Stabilizer | TEP (ppm) | 200 | 200 | 200 | 200 | 200 | 200 | 200 |
| Experimental results | Diol composition | ISB (mol %) | 7 | 13 | 12 | 21 | 29 | 33 | 41 |
| | | CHDM (mol %) | 45 | 45 | 47 | 45 | 45 | 46 | 45 |
| | | EG (mol %) | 48 | 42 | 41 | 34 | 26 | 21 | 14 |
| | ISB residual rate (%) | | 35.0 | 32.5 | 24.0 | 35.0 | 36.3 | 33.2 | 34.4 |
| | IV (dl/g) | | 0.66 | 0.64 | 0.58 | 0.60 | 0.58 | 0.45 | 0.32 |
| | Number average molecular weight (Mn) | | 23,100 | 22,300 | 19,400 | 21,800 | 20,600 | 11,900 | 9,400 |

TABLE 2-continued

| Components | Comparative Example 1 | Comparative Example 2 | Comparative Example 3 | Comparative Example 4 | Comparative Example 5 | Comparative Example 6 | Comparative Example 7 |
|---|---|---|---|---|---|---|---|
| Heat resistance (° C.) | 88 | 96 | 95 | 104 | 110 | 110 | 108 |
| Color b | 1.5 | 1.5 | 1 | 2 | 2 | 3 | 3 |
| Haze (%) | <1 | <1 | <1 | <1 | <1 | <1 | <1 |
| Tensile strength (MPa) | 43 | 43 | 43 | 45 | 45 | Not measurable | Not measurable |
| Young's modulus (MPa) | 1360 | 1370 | 1430 | 1430 | 1480 | Not measurable | Not measurable |

Examples 8 to 13

Raw materials, i.e., dimethylterephthalic acid, isosorbide, and 1,2-propanediol, except for 1,4-cyclohexanedimethanol, as diol components were injected according to the contents of Table 3 below. Triethyl phosphate (TEP) which is a phosphorus-based stabilizer and tetrabutyldibutoxytin oxide (TBT) which is a catalyst were added thereto in terms of each central atom according to the contents of Table 1, with respect to the total weight of the raw materials, and then pressurized with nitrogen to a pressure of 2.0 kg/cm², and reaction was allowed while raising the temperature of the reactor to 220° C. to 250° C.

At this time, generated methanol was discharged from the system, followed by transesterification. When generation and discharge of methanol were finished, the reaction product was transferred to a polycondensation reactor equipped with a stirrer, a cooling condenser, and a vacuum system to perform polycondensation, and the polymerization was terminated when the intrinsic viscosity of the reaction product reached its maximum value.

Comparative Examples 8 to 13

Polyester resins were prepared in the same manner as in Examples 8 to 13, except that ethylene glycol (EG) was used instead of 1,2-propanediol, and raw materials were injected according to the contents in Table 4 below.

TABLE 3

| | Components | | Example 8 | Example 9 | Example 10 | Example 11 | Example 12 | Example 13 |
|---|---|---|---|---|---|---|---|---|
| Input ratio | Diacid | DMT (mol) | 100 | 100 | 100 | 100 | 100 | 100 |
| | Diol | ISB (mol) | 20 | 40 | 60 | 80 | 100 | 120 |
| | | 1,2-PD (mol) | 180 | 160 | 140 | 120 | 100 | 80 |
| | Reaction catalyst | TBT (ppm) | 250 | 250 | 250 | 200 | 200 | 200 |
| | Stabilizer | TEP (ppm) | 100 | 100 | 100 | 100 | 100 | 100 |
| Experimental results | Diol composition | ISB (mol %) | 15 | 27 | 41 | 48 | 59 | 66 |
| | | 1,2-PD (mol %) | 85 | 73 | 59 | 52 | 41 | 34 |
| | ISB residual rate (%) | | 75.0 | 67.5 | 68.3 | 60.0 | 59.0 | 55.0 |
| | IV (dl/g) | | 0.52 | 0.57 | 0.58 | 0.60 | 0.55 | 0.58 |
| | Number average molecular weight (Mn) | | 17,800 | 19,700 | 20,600 | 21,800 | 20,100 | 19,900 |
| | Heat resistance (° C.) | | 93 | 106 | 126 | 132 | 141 | 150 |
| | Color b | | 5 | 4.5 | 4.5 | 5 | 4.5 | 4.5 |
| | Haze (%) | | <2 | <2 | <2 | <2 | <2 | <2 |
| | Tensile strength (MPa) | | 48 | 48 | 50 | 57 | 58 | 57 |
| | Young's modulus (MPa) | | 1480 | 1520 | 1550 | 1690 | 1660 | 1700 |

TABLE 4

| | Components | | Comparative Example 8 | Comparative Example 9 | Comparative Example 10 | Comparative Example 11 | Comparative Example 12 | Comparative Example 13 |
|---|---|---|---|---|---|---|---|---|
| Input ratio | Diacid | DMT (mol) | 100 | 100 | 100 | 100 | 100 | 100 |
| | Diol | ISB (mol) | 20 | 40 | 60 | 80 | 100 | 120 |
| | | EG (mol) | 180 | 160 | 140 | 120 | 100 | 80 |
| | Reaction catalyst | TBT (ppm) | 250 | 250 | 250 | 200 | 250 | 250 |
| | Stabilizer | TEP (ppm) | 100 | 100 | 100 | 100 | 100 | 100 |
| Experimental results | Diol composition | ISB (mol %) | 7 | 16 | 25 | 34 | 42 | 57 |
| | | EG (mol %) | 93 | 84 | 75 | 66 | 58 | 43 |
| | ISB residual rate (%) | | 35.0 | 40.0 | 41.7 | 42.5 | 42.0 | 47.5 |
| | IV (dl/g) | | 0.57 | 0.60 | 0.58 | 0.54 | 0.54 | 0.31 |

TABLE 4-continued

| Components | Comparative Example 8 | Comparative Example 9 | Comparative Example 10 | Comparative Example 11 | Comparative Example 12 | Comparative Example 13 |
|---|---|---|---|---|---|---|
| Number average molecular weight (Mn) | 17,800 | 19,700 | 20,600 | 21,800 | 20,100 | 10,500 |
| Heat resistance (° C.) | 86 | 93 | 101 | 112 | 121 | 115 |
| Color b | 4 | 5 | 4.5 | 4.5 | 5 | 5 |
| Haze (%) | <2 | <2 | <2 | <2 | <2 | <2 |
| Tensile strength (MPa) | 45 | 47 | 48 | 47 | 48 | Not measurable |
| Young's modulus (MPa) | 1480 | 1520 | 1580 | 1550 | 1500 | Not measurable |

When Tables 1 and 2, and Tables 3 and 4 were compared with each other, respectively, the polyethylene resins prepared by including 1,2-propanediol instead of ethylene glycol were found to exhibit excellent heat resistance due to remarkable improvement of the residual rate of isosorbide. Further, as compared with existing polyethylene resins including ethylene glycol, the polyethylene resins including 1,2-propanediol were found to exhibit similar appearance properties and transparency while exhibiting equivalent or improved tensile strength and Young's modulus, indicating excellent mechanical strength.

The invention claimed is:

1. A polyester resin comprising:
moieties of dicarboxylic acid components including terephthalic acid; and
moieties of diol components including isosorbide and 1,2-propanediol,
wherein the isosorbide-derived moieties are 5 mol % or more and the 1,2-propanediol-derived moieties are 10 mol % or more in 100 mol % of the moieties of diol components, and
wherein the diol components do not comprise diol moieties derived from ethylene glycol.

2. The polyester resin of claim 1, wherein the moieties of diol components include 5 mol % to 70 mol % of isosorbide-derived moieties and 30 mol % to 95 mol % of 1,2-propanediol-derived moieties.

3. The polyester resin of claim 1, wherein a glass transition temperature (Tg) is 80° C. or higher.

4. The polyester resin of claim 1, wherein the diol components further include one or more diol compounds selected from the group consisting of C8-C40 aromatic diols and C2-C20 aliphatic diols, in addition to isosorbide and 1,2-propanediol.

5. The polyester resin of claim 1, wherein the diol components further include 1,4-cyclohexanedimethanol, in addition to isosorbide and 1,2-propanediol, and the moieties of diol components include 5 mol % to 45 mol % of isosorbide-derived moieties, 10 mol % to 50 mol % of 1,2-propanediol-derived moieties, and the balance of 1,4-cyclohexanedimethanol-derived moieties.

6. The polyester resin of claim 1, wherein the dicarboxylic acid components further include one or more acid components selected from the group consisting of C8-C20 aromatic dicarboxylic acid components and C4-C20 aliphatic dicarboxylic acid components, in addition to terephthalic acid.

7. The polyester resin of claim 1, further comprising moieties of C6-C20 multifunctional carboxylic acid components, the C6-C20 multifunctional carboxylic acid components comprising three or more carboxyl groups.

8. A method of preparing a polyester resin, wherein a residual rate of isosorbide in the polyester is 40% or more, and wherein the polyester does not comprise diol moieties derived from ethylene glycol, the method comprising the steps of:
performing an esterification or transesterification reaction between dicarboxylic acid components including terephthalic acid, and diol components including isosorbide and 1,2-propanediol at a pressure of 0.2 kg/cm² to 3.0 kg/cm² and at a temperature of 200° C. to 300° C.; and
performing a polycondensation reaction of the reaction product at a reduced pressure of 400 mmHg to 0.1 mmHg and at a temperature of 240° C. to 300° C.

9. The method of claim 8, wherein the diol components include 5 mol % to 70 mol % of isosorbide and 30 mol % to 95 mol % of 1,2-propanediol with respect to the total 100 mol % of the diol components.

10. The method of claim 8, wherein the diol components further include 1,4-cyclohexanedimethanol.

11. The method of claim 10, wherein the diol components include 5 mol % to 50 mol % of isosorbide, 10 mol % to 75 mol % of 1,2-propanediol, and the balance of 1,4-cyclohexanedimethanol with respect to the total 100 mol % of the diol components.

12. The method of claim 8, wherein a molar ratio of the dicarboxylic acid components and the diol components is 1:1 to 1:3.

13. The method of claim 8, wherein a C6-C20 multifunctional carboxylic acid component is further included in the esterification or trans esterification reaction step, the C6-C20 multifunctional carboxylic acid component comprising three or more carboxyl groups.

* * * * *